United States Patent [19]

McGill

[11] 4,406,461
[45] Sep. 27, 1983

[54] INFLATABLE WELL PACKER APPARATUS REINFORCED WITH TIRE CORDING

[75] Inventor: Howard L. McGill, Lufkin, Tex.

[73] Assignee: Schlumberger Technology Corporation, New York, N.Y.

[21] Appl. No.: 357,485

[22] Filed: Mar. 12, 1982

[51] Int. Cl.³ ............................................. F16J 15/46
[52] U.S. Cl. .................................. 277/34.6; 277/230; 277/30; 277/DIG. 6; 166/187
[58] Field of Search ........................ 277/1, 12, 30-32, 277/DIG. 6, 34, 34.3, 34.6, 226-230; 166/120-122, 187

[56] References Cited

U.S. PATENT DOCUMENTS

| | | | |
|---|---|---|---|
| 2,611,437 | 9/1952 | Lynes | 277/34.6 |
| 2,827,965 | 3/1958 | Mounce | 277/34.6 |
| 2,828,823 | 4/1958 | Mounce | 277/34.6 |
| 3,003,798 | 10/1961 | Sandlin | 287/20 |
| 3,085,628 | 4/1963 | Malone | 277/34 |
| 3,529,667 | 9/1970 | Malone | 166/187 X |
| 3,923,312 | 12/1975 | Hutchinson et al. | 277/34.6 |
| 3,961,667 | 6/1976 | Mitchell | 166/187 |
| 4,003,581 | 1/1977 | Hutchinson | 166/187 X |
| 4,253,676 | 3/1981 | Baker et al. | 166/187 X |

Primary Examiner—Robert S. Ward, Jr.

[57] ABSTRACT

An inflatable well packer apparatus comprises a generally tubular resilient body that is internally reinforced by a plurality of biased plys or layers of tire cording. The ends of the tire cording layers extend beyond the ends of the resilient body where they are secured to end fitting assemblies having gripping engagement therewith.

12 Claims, 2 Drawing Figures

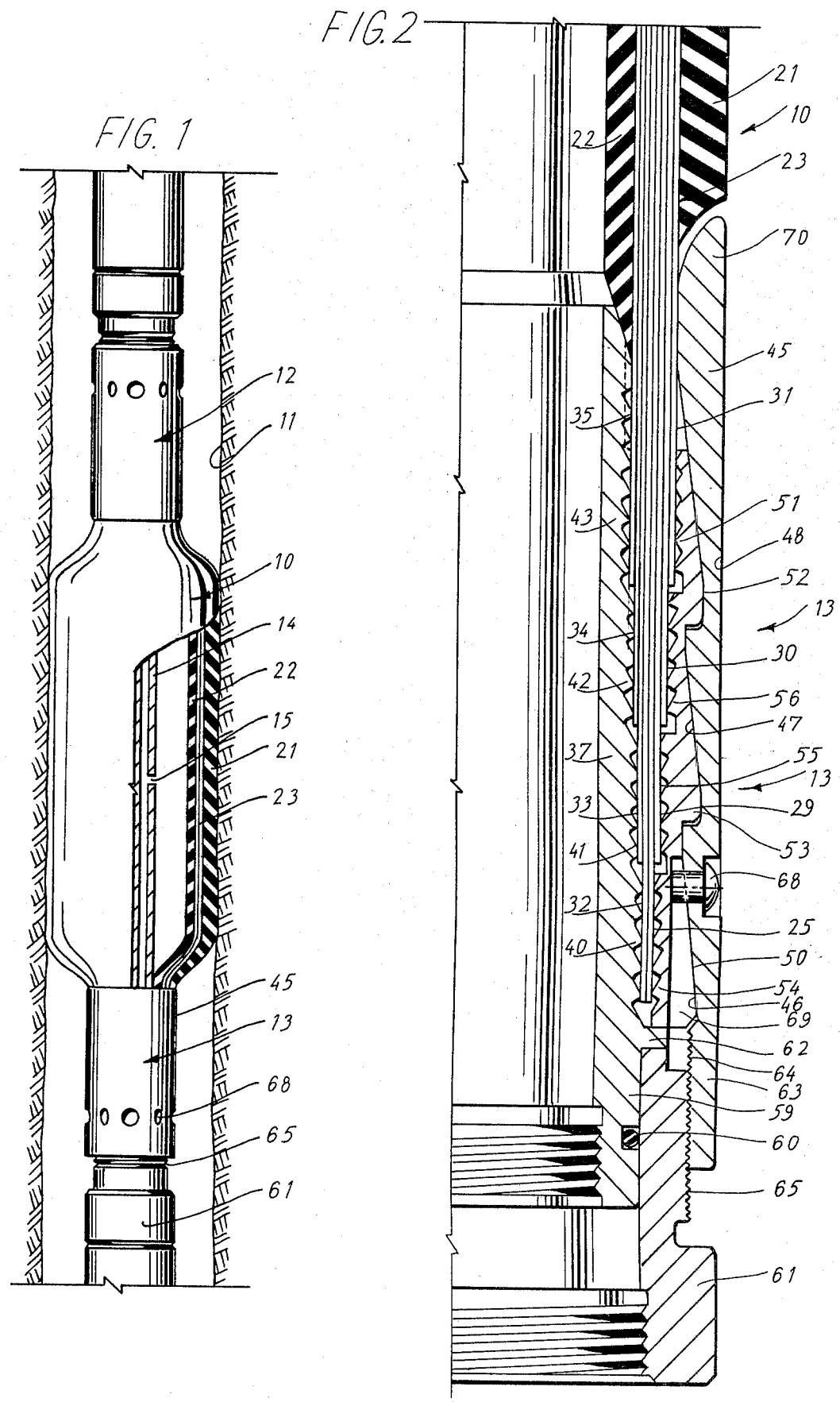

INFLATABLE WELL PACKER APPARATUS REINFORCED WITH TIRE CORDING

FIELD OF THE INVENTION

This invention relates generally to inflatable well packers, and specifically to a new and improved single piece inflatable well packer that is internally reinforced by layers of tire cording.

BACKGROUND OF THE INVENTION

It has been common practice for many years to use one or more inflatable packers that are expanded by fluid under pressure to isolate a zone of a well during the performance of a drill stem test. One of the more common types of inflatable packers in current use has a multi layered construction comprising an inner bladder, a reinforced annular boot and a sheath of wire or cable braid that is secured to end fittings. The cables are arranged in parallel sets that are woven over and under one another with their end secured to the end fittings by an epoxy potting process that is disclosed in U.S. Pat. No. 3,003,798 issued Oct. 10, 1961. This type of inflatable packer construction has a number of shortcomings. As the packer element is expanded by internally applied fluid pressure, the inner tube and boot tend to extrude through the gaps between the reinforcing cable members causing rupture and packer failure. In addition, the manufacture of this type of packer is labor intensive, because the reinforcing cables are hand woven during assembly. It also has been difficult to replace the inner bladder and boot which must be folded for insertion due to size constraints.

It is an object of the present invention to provide a new and improved inflatable packer element.

Another object of the present invention is to provide a new and improved inflatable packer element of the type described that is fabricated as a single piece unit.

Yet another object of the present invention is to provide a new and improved inflatable packer element having tire cord reinforcing means that is coupled to uniquely constructed end fittings.

SUMMARY OF THE INVENTION

These and other objects are attained in accordance with the concepts of the present invention through the provision of an inflatable packer element comprising a tubular elastomer body having inner and outer resilient members reinforced by a plurality of layers of tire cording positioned therebetween. Each of the tire cording layers has co-parallel, small diameter tensile strength members calendared with rubber, and the layers are each arranged on a bias such that the strength members extend in alternating helical directions. The helix angles of the strength members with respect to the axis of the body preferably are in a range of from 16° to 20°, such angle gradually increasing in value from the innermost layer to the outermost layer. The end portions of the tire cording layers are arranged to extend beyond the opposite ends of the elastomer body and are coupled to uniquely constructed end fittings. Each end fitting includes an inner member with toothed outer surfaces, and a plurality of circumferentially spaced gripping members having toothed inner surfaces. The end portions of the tire cording layers are received between the toothed surfaces, and an axial cam means having inclined surfaces cooperable with inclined surfaces on the gripping members is operable to cause the surfaces to tightly grip the end portions to secure the end fitting assemblies to the ends of the elastomer body. The overall arrangement provides a composite tubular structure that is more reliable and easier to fabricate than known structures.

BRIEF DESCRIPTION OF THE DRAWINGS

The present invention has other features, objects and advantages that will become clearly apparent in connection with the following detailed description of a preferred embodiment taken in conjunction with the appended drawings in which:

FIG. 1 is a schematic view of a drill stem testing tool including an inflatable packer disposed in the well bore; and FIG. 2 is a fragmentary half sectional view of an inflatable packer element and end fitting assembly constructed in accordance with the present invention.

DETAILED DESCRIPTION OF A PREFERRED EMBODIMENT

Referring initially to FIG. 1, there is shown schematically an inflatable packer element 10 that has been run into the well bore 11 in a normally retracted condition as a part of the drill stem testing tool string and then inflated in an appropriate manner to seal off the end of a zone of the well to be tested. The packer element 10 is mounted on a suitably arranged mandrel assembly 14 having an inflation fluid passage 15 so that fluid under pressure can be supplied to the interior of the element in order to inflate the same. The upper end of the packer element 10 is connected to an end fitting assembly 12 that is fixed to the mandrel in an appropriate manner, whereas a similarly constructed end fitting assembly 13 that is connected to the lower end of the element is arranged to slide relatively along the mandrel as the element is inflated and deflated. The mandrel assembly may include concentrically arranged tubular members that provide test and straddle bypass passages as will be familiar to those skilled in the art.

Referring now to FIG. 2, the packer element 10 includes inner and outer tubular members 22, 21 made of rubber and having an annular sheath 23 of reinforcing located therebetween. The outer member 21 preferably is compounded to be abrasion resistant since its outer surface will come into contact with various earth formation materials, whereas the inner layer 22 preferably is compounded to expand readily under pressure. The reinforcing sheath 23 is constituted by a plurality of layers (for example, eight as shown) of tire cording. As used herein, the term "tire cording" means a fabric comprised of co-parallel tensile strength members such as stranded steel wires or Kavlar strands that are woven with pick cords of nylon or cotton, the fabric being dipped in a bonding agent and calendared with rubber to form a sheet of uniform thickness. The strength members are of relatively small diameter, for example, 40-60 thousandths of an inch and are laid out close together. A tire cording of the type described is commercially available from various sources, and can be purchased from Steelastic Corporation, Akron, Ohio. The layers of tire cording are suitably bonded to each other and to the adjacent surfaces of the members 21, 22 to provide essentially a one-piece inflatable packer element in accordance with the present invention.

The layers of tire cording are positioned on a bias during manufacture with the parallel strength members or adjacent layers extending in alternating helical directions. In a preferred embodiment, the helix angle of the strength members of the innermost layer is about 16° with respect to the longitudinal axis of the mandrel assembly, such angle being increased gradually for each layer, and the outermost layer having its strength members extending at a helix angle of about 20°. The provision of opposite hand lay directions provides a composite structure having very little tendency to twist when put under tension during inflation and expansion, and the close spacing of the strength members practically eliminates any gaps through which the inner resilient member 22 can extrude under pressure. As previously mentioned, the layers of tire cording are bonded to each other and to the inner and outer elastomer members 21, 22 to provide a unitary construction.

Each of the layers of tire cording is dimensioned such that its opposite ends extend beyond the ends of the elastomer members 21, 22 where the exposed portions are arranged to be coupled to the respective end fitting assemblies. The structure and manner of connection of the lower end fitting assembly 13 is shown in FIG. 2, and it will be appreciated that the upper end fitting assembly 12 is constructed of like parts having the opposite orientation. As illustrated, the end portions of the various layers of tire cording have different lengths, with the center pair of end portions being the longest and the innermost and outermost layer end portions being the shortest. The progressive reduction in end portion length provides a structure having exposed annular outer surfaces 28–31 and exposed annular inner surfaces 32–35.

The end fitting assembly 13 includes an inner sleeve member 37 having axially spaced sets of downwardly facing teeth 40–43 formed on its outer periphery. The teeth are formed on different outer diameters as shown and are arranged to grip the respective inner surfaces 32–35 on the innermost layers of tire cord reinforcing. An outer sleeve member 45 is provided with upwardly and inwardly inclined annular surfaces 46–48 which slidably engage the companion outer inclined surfaces 50–52 of a plurality of circumferentially spaced gripping members 53. Each of the gripping members 53 has axially spaced sets of downwardly facing teeth 54–57 on its inner periphery, with the teeth being formed on different inner diameters as shown so as to engage the respective outer surfaces 28–31 of the outermost layers of tire cord reinforcing.

The lower end section 59 of the inner sleeve member 37 is sealed by an O-ring 60 with respect to a collar 61 having an upper end that engages an outwardly directed flange 62 on the inner sleeve member. The lower end section 63 of the outer sleeve member 45 is provided with internal threads 64 that engage companion threads 65 on the collar 61 so that rotation of the outer sleeve member relative to the collar will advance the sleeve member downwardly with respect to the gripping elements 53 and thereby cause the inclined surfaces 46–48 to wedge the gripping elements radially inwardly. Such inward movement causes all the various layers of tire cord reinforcing to be firmly anchored and secured to the end fitting assembly through gripping engagement of the teeth with the exposed interior and exterior surfaces thereof.

In the preferred embodiment, the teeth on the inner sleeve member 37 are formed as axially spaced ribs in order to provide a fluid-tight seal against each of inner layers of tire cording. Moreover, the outer edges of the teeth are flattened as shown to prevent the strength members of the reinforcing layers from being cut or otherwise damaged when the end portions are forcefully engaged by the teeth. A plurality of locking pins 68 may extend through apertures in the outer member 45 and engage in longitudinally extending slots 69 in the lower end portion of each gripping element 53 in order to prevent relative rotation from occurring once the parts are assembled as shown in the drawings. Both the inner member 37 and the collar 61 have internal threads that are secured to associated parts of the inner mandrel assembly (not shown) when the tool string is assembled. The upper end section 70 of the outer member 45 may have a rounded inner surface to prevent damage to the outer resilient element 21 or the outer layers of reinforcing when the packer element is inflated.

OPERATION

In use, the packer element 10 constructed as described above is coupled to the end fittings 12 and 13 by inserting the exposed end portions of the reinforcing layers in between the inner sleeve member 37 and the gripping members 53 to the position shown in the drawings. Initially the outer sleeve member 45 is in the upper position so that the gripping members 53 are loosely received therein. With the outer surfaces 28–31 and the inner surfaces 32–35 disposed adjacent to the toothed surfaces of the inner sleeve member 37 and the gripping elements 53, the outer sleeve member 45 is rotated relative to the collar 61 in order to advance the sleeve member downwardly. This causes the gripping members 53 to be shifted laterally inwardly so that the various end portions of the reinforcing layers become forcefully engaged by the teeth. The locking pins 68 are then inserted to prevent any loosening of the outer sleeve member 45. The upper end fitting assembly 12 is of course assembled with the upper end of the packer element in the same manner.

The drill stem testing tool string is lowered into the well until the packing element 10 is located at the proper depth. Then a pump assembly that is included in the tool string is operated to supply fluid under pressure to the interior of the packing element 10, causing the element to be inflated and expanded into sealing contact with the surrounding well bore wall. As previously mentioned, the lower end fitting 13 typically is arranged to move upwardly with respect to the mandrel assembly upon which the packing element is mounted as it is inflated. In any event, any tensile forces induced in the strength members of the reinforcing sheath 23 during inflation merely causes the gripping members 53 to be wedged even more tightly against the end portions of the respective tire cording layers. When the drill stem test is to be terminated, the pressure within the packer element 10 is vented to the well annulus to enable the element to inherently retract to its original transverse dimension.

It now will be recognized that a new and improved inflatable packer element has been disclosed. The packer element is fabricated as a unitary assembly which is practically immune from rupture and other failures that have been experienced with prior art structures. The packer element can be quickly and easily assembled with the unique end fittings as disclosed herein.

Since certain changes or modifications may be made in the disclosed embodiment without departing from the inventive concepts involved, it is the aim of the appended claims to cover all such changes and modifications falling within the true spirit and scope of the present invention.

What is claimed is:

1. An inflatable packer element comprising: a unitary, generally tubular elastic body having inner and outer elastomer members and a reinforcing sheath therebetween, said sheath including a plurality of layers of tire cord fabric each having coparallel tensile strength members, said layers being bonded to one another and to said members and being arranged on a bias such that the strength members of adjacent layers extend in alternating helical directions with respect to the longitudinal axis of said body, said layers being dimensioned such that end portions thereof extend beyond the ends of said elastomer members to enable said end portions to be connected to associated end fittings.

2. The packer element of claim 1 wherein the helix angles of said strength members with respect to the longitudinal axis of said body lie in the range of from about 16° to about 20°.

3. The packer element of claim 2 wherein the helix angle of the strength members of the respective ones of said layers is gradually increased from a value of about 16° for the innermost layer to a value of about 20° for the outermost layer.

4. The packer element of claim 1 wherein said layers extend beyond the ends of said elastomer members different distances with the center layers of said sheath extending the greatest distance and the innermost and outermost layers thereof extending the least distance.

5. An inflatable well packer comprising: a unitary, generally tubular elastic body having inner and outer elastomer members bonded to a reinforcing sheath that includes a plurality of layers of tire cording each having co-parallel tensile strength members, said layers being arranged on a bias such that the strength members of adjacent layers extend in opposite hand helical directions with respect to the longitudinal axis of said body, said layers being dimensioned such that end portions thereof extend beyond the ends of said elastomer members; and end fitting means at each end of said body for gripping individual ones of said end portions to thereby anchor and sealingly secure the ends of said body thereto.

6. The well packer of claim 5 wherein each of said end fitting means includes an inner sleeve member and an outer sleeve member, said inner sleeve member having toothed outer surfaces engaging and gripping individual end portions of the inner layers of said sheath, said outer sleeve member having internal surfaces inclining inwardly towards said axis of said body, and a plurality of circumferentially spaced gripping elements having inclined outer surfaces slidably engaging said internal surfaces and toothed inner surfaces engaging and gripping individual end portions of the outer layers of said sheath.

7. The well packer of claim 6 further including means for moving said outer sleeve member axially with respect to said gripping elements to cause said gripping elements to be shifted radially inwardly toward said inner sleeve member whereby the respective end portions of said layers are gripped between said inner sleeve member and said gripping elements.

8. The well packer of claim 6 wherein the end portions of said inner and outer layers have differing lengths to provide inwardly and outwardly facing exposed surfaces, said toothed surfaces of said inner sleeve member being formed in axially spaced sets arranged to engage individual ones of said inwardly facing surfaces, said toothed surfaces of said gripping elements being formed in axially spaced sets arranged to engage individual ones of said outwardly facing surfaces.

9. The well packer of claim 7 wherein said moving means comprises threads on said outer sleeve member arranged such that rotation of said outer sleeve member in one rotational direction causes inward shifting of said gripping elements and rotation of said outer sleeve member in the other rotational direction enables outward shifting of said gripping elements.

10. The well packer apparatus of claim 9 further including means operable when said gripping elements are shifted inwardly for preventing relative rotation of said outer sleeve member.

11. The well packer apparatus of claim 6 wherein the said toothed surfaces on said inner sleeve member are arranged to prevent fluid leakage between said inner sleeve member and the individual end portions of said inner layers of said sheath.

12. The well packer apparatus of claim 11 wherein the toothed surfaces of said inner sleeve member and said gripping elements are formed with substantially flat outer edges which engage the individual end portions of said layers of said sheath.

* * * * *